(12) United States Patent
Wu et al.

(10) Patent No.: US 10,123,187 B2
(45) Date of Patent: Nov. 6, 2018

(54) METHODS AND APPARATUS FOR MULTIPLEXING APPLICATION IDENTIFIERS FOR PEER-TO-PEER DISCOVERY SYSTEMS

(75) Inventors: Zhibin Wu, Bedminster, NJ (US);
Ranjith S. Jayaram, Short Hills, NJ (US); Georgios Tsirtsis, London (GB);
Michaela Vanderveen, Tracy, CA (US);
Vincent D. Park, Budd Lake, NJ (US)

(73) Assignee: Qualcomm Incorporated, San Diego, CA (US)

( * ) Notice: Subject to any disclaimer, the term of this patent is extended or adjusted under 35 U.S.C. 154(b) by 1001 days.

(21) Appl. No.: 13/448,615

(22) Filed: Apr. 17, 2012

(65) Prior Publication Data
US 2013/0272193 A1    Oct. 17, 2013

(51) Int. Cl.
*H04W 4/00* (2018.01)
*H04W 4/38* (2018.01)
*H04W 4/50* (2018.01)

(52) U.S. Cl.
CPC .............. *H04W 4/38* (2018.02); *H04W 4/50* (2018.02)

(58) Field of Classification Search
CPC ...................................................... H04W 4/006
USPC ........................................................... 370/328
See application file for complete search history.

(56) References Cited

U.S. PATENT DOCUMENTS

| | | | |
|---|---|---|---|
| 6,877,162 B1 * | 4/2005 | Thompson | G06F 9/465 719/315 |
| 7,079,839 B1 * | 7/2006 | Papineau | H04L 67/02 455/412.1 |
| 7,260,393 B2 | 8/2007 | Fnu et al. | |
| 7,530,079 B2 * | 5/2009 | Stubbs | G06F 8/20 717/100 |
| 7,730,482 B2 * | 6/2010 | Illowsky | G06F 1/3203 709/202 |

(Continued)

FOREIGN PATENT DOCUMENTS

| | | |
|---|---|---|
| EP | 2166799 A1 | 3/2010 |
| JP | 2006510124 A | 3/2006 |

(Continued)

OTHER PUBLICATIONS

International Search Report and Written Opinion—PCT/US2013/036823—ISA/EPO—dated Sep. 12, 2013.

(Continued)

*Primary Examiner* — Guang W Li
(74) *Attorney, Agent, or Firm* — Arent Fox, LLP and Qualcomm Incorporated

(57) ABSTRACT

A method, a computer program product, and an apparatus are provided. The apparatus may be equipped to obtain one or more application identifiers from one or more applications on a wireless device, generate a super identifier (SID) having elements corresponding to the one or more applications and a base that identifies one or more common properties of the one or more applications, and broadcast the SID during one or more peer discovery slots allocated for the wireless device. In another example, a UE may be equipped to receive the SID broadcast by another UE, determine a match between at least one of the one or more common properties in the base, and determine whether an element associated with one or more applications is present in the SID.

29 Claims, 13 Drawing Sheets

PEER TO PEER
COMMUNICATIONS SYSTEM

(56) References Cited

U.S. PATENT DOCUMENTS

| | | | | |
|---|---|---|---|---|
| 7,779,408 B1* | 8/2010 | Papineau | H04W 4/00 | 709/219 |
| 7,899,915 B2* | 3/2011 | Reisman | G06F 17/30873 | 709/227 |
| 8,081,567 B2* | 12/2011 | Li | H04L 29/12339 | 370/230 |
| 8,275,672 B1* | 9/2012 | Nguyen | G06Q 30/0635 | 705/26.1 |
| 8,448,157 B2* | 5/2013 | Mitran | G06F 8/441 | 717/151 |
| 8,806,574 B2* | 8/2014 | Manjunath | G06F 21/629 | 726/1 |
| 9,002,342 B2 | 4/2015 | Tenhunen et al. | 455/419 | |
| 9,213,538 B1* | 12/2015 | Ladd | G06F 8/70 | |
| 2001/0002129 A1* | 5/2001 | Zimmerman | G06F 9/451 | 715/700 |
| 2004/0019645 A1* | 1/2004 | Goodman | G06Q 10/107 | 709/206 |
| 2004/0085947 A1* | 5/2004 | Ekberg | H04W 48/16 | 370/349 |
| 2004/0168158 A1* | 8/2004 | Jensen | G06Q 99/00 | 717/136 |
| 2004/0205545 A1* | 10/2004 | Bargeron | G06F 17/241 | 715/205 |
| 2005/0050555 A1* | 3/2005 | Exley | G06F 9/541 | 719/328 |
| 2005/0184163 A1* | 8/2005 | de Jong | G06Q 20/341 | 235/492 |
| 2006/0129634 A1* | 6/2006 | Khouzam | G06F 8/38 | 709/203 |
| 2007/0109976 A1 | 5/2007 | Samanta et al. | | |
| 2007/0129015 A1* | 6/2007 | Iwamoto | H04L 12/2854 | 455/41.2 |
| 2007/0141988 A1* | 6/2007 | Kuehnel | H04W 8/005 | 455/41.2 |
| 2007/0282810 A1* | 12/2007 | Mueller | G06F 17/30595 | |
| 2008/0177772 A1* | 7/2008 | Karamchedu | G06F 21/6209 | |
| 2009/0016255 A1* | 1/2009 | Park | 370/312 | |
| 2009/0022054 A1* | 1/2009 | Kim | H04W 28/10 | 370/235 |
| 2009/0247077 A1 | 10/2009 | Sklovsky et al. | | |
| 2010/0299715 A1* | 11/2010 | Slothouber | H04N 21/235 | 725/118 |
| 2010/0318795 A1 | 12/2010 | Haddad et al. | | |
| 2011/0007639 A1 | 1/2011 | Richardson | | |
| 2011/0041168 A1* | 2/2011 | Murray | G06Q 30/02 | 726/7 |
| 2011/0069658 A1 | 3/2011 | Tiwari | | |
| 2011/0153789 A1* | 6/2011 | Vandwalle | H04W 8/005 | 709/221 |
| 2011/0211503 A1 | 9/2011 | Che et al. | | |
| 2011/0302019 A1* | 12/2011 | Proctor et al. | 705/14.27 | |
| 2012/0082127 A1 | 4/2012 | Wu et al. | | |
| 2012/0260312 A1* | 10/2012 | Backman | H04L 63/12 | 726/3 |
| 2012/0317261 A1* | 12/2012 | Ahmavaara | 709/223 | |
| 2012/0320815 A1* | 12/2012 | Massena | H04W 4/02 | 370/313 |
| 2013/0040566 A1* | 2/2013 | Mourtel | G06K 7/0008 | 455/41.1 |
| 2013/0242871 A1* | 9/2013 | Marinier et al. | 370/328 | |

FOREIGN PATENT DOCUMENTS

| | | |
|---|---|---|
| JP | 2010081603 A | 4/2010 |
| JP | 2011071987 A | 4/2011 |
| WO | WO-2004040918 A2 | 5/2004 |
| WO | WO-2008048650 A2 | 4/2008 |
| WO | WO-2009009452 | 1/2009 |

OTHER PUBLICATIONS

Alcatel-Lucent Shanghai Bell, et al., "Methods to Support Different Time Scales for TDD UL-DL Reconfiguration", 3GPP Draft; R1-122508 Methods to Support Different Time Scales for TDD UL-DL Reconfiguration, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), pp. 1-2, XP050601078, [retrieved on May 12, 2012].

* cited by examiner

METHODS AND APPARATUS FOR
MULTIPLEXING APPLICATION
IDENTIFIERS FOR PEER-TO-PEER
DISCOVERY SYSTEMS

BACKGROUND

Field

The present disclosure relates generally to communication systems, and more particularly, to communication of application identifiers during peer-to-peer (P2P) discovery.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In wireless P2P communication systems, each peer device may have varying numbers of applications installed on the device. For discovery purposes, each of the applications may be operable to announce its presence periodically and/or continuously in a time-slotted fashion in a shared peer discovery channel of limited resources. As a result, the peer discovery channel resources allocated to the device may prove to be insufficient. For example, where a bit rate of the announcements is too low, long intervals between two consecutive announcements for each application may result. This arrangement may cause increased discovery latency for each of the individual application identifiers announced. In other words, individual announcements by each application mat render the peer discovery channel unsuitable for supporting a large number of applications per device. As such, a method and apparatus to provide efficient communication of application identifiers during P2P discovery is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection communication of a super application identifier during P2P discovery. In one example, a UE is equipped to obtain one or more application identifiers from one or more applications on a wireless device, generate a super identifier (SID) having elements corresponding to the one or more applications and a base that identifies one or more common properties of the one or more applications, and broadcast the SID during one or more peer discovery slots allocated for the wireless device. In another example, a UE may be equipped to receive the SID broadcast by another UE, determine a match between at least one of the one or more common properties in the base, and determine whether an element associated with one or more applications is present in the SID.

According to related aspects, a method for communication of a super application identifier during P2P discovery is provided. The method can include obtaining one or more application identifiers from one or more applications on a wireless device. Further, the method can include generating a SID having elements corresponding to the one or more applications and a base that identifies one or more common properties of the one or more applications. Moreover, the method may include broadcasting the SID during one or more peer discovery slots allocated for the wireless device.

Another aspect relates to a wireless communications apparatus enabled to communication a super application identifier during P2P discovery. The wireless communications apparatus can include means for obtaining one or more application identifiers from one or more applications on a wireless device. Further, the wireless communications apparatus can include means for generating a SID having elements corresponding to the one or more applications and a base that identifies one or more common properties of the one or more applications. Moreover, the wireless communications apparatus can include means for broadcasting the SID during one or more peer discovery slots allocated for the wireless device.

Another aspect relates to a wireless communications apparatus. The apparatus can include a processing system configured to obtain one or more application identifiers from one or more applications on a wireless device. Further, the processing system may be configured to generate a SID having elements corresponding to the one or more applications and a base that identifies one or more common properties of the one or more applications. Moreover, the processing system may further be configured to broadcast the SID during one or more peer discovery slots allocated for the wireless device.

Still another aspect relates to a computer program product, which can have a computer-readable medium including code for obtaining one or more application identifiers from one or more applications on a wireless device. Further, the computer-readable medium can include code for generating a SID having elements corresponding to the one or more applications and a base that identifies one or more common properties of the one or more applications. Moreover, the computer-readable medium can include code for broadcasting the SID during one or more peer discovery slots allocated for the wireless device.

According to related aspects, a method for communication of a super application identifier during P2P discovery is provided. The method can include receiving a SID having elements corresponding to the one or more applications associated with a first device and a base that identifies one or more common properties of the one or more applications. Further, the method can include determining a match between at least one of the one or more common properties in the base. Moreover, the method may include determining whether an element associated with one or more applications is present in the SID.

Another aspect relates to a wireless communications apparatus enabled to process a super application identifier as part of P2P discovery. The wireless communications apparatus can include means for receiving a SID having elements corresponding to the one or more applications associated with a first device and a base that identifies one or more common properties of the one or more applications. Further, the wireless communications apparatus can include means for determining a match between at least one of the one or more common properties in the base. Moreover, the wireless communications apparatus can include means for determining whether an element associated with one or more applications is present in the SID.

Another aspect relates to a wireless communications apparatus. The apparatus can include a processing system configured to receive a SID having elements corresponding to the one or more applications associated with a first device and a base that identifies one or more common properties of the one or more applications. Further, the processing system may be configured to determine a match between at least one of the one or more common properties in the base. Moreover, the processing system may further be configured to determine whether an element associated with one or more applications is present in the SID.

Still another aspect relates to a computer program product, which can have a computer-readable medium including code for receiving a SID having elements corresponding to the one or more applications associated with a first device and a base that identifies one or more common properties of the one or more applications. Further, the computer-readable medium can include code for determining a match between at least one of the one or more common properties in the base. Moreover, the computer-readable medium can include code for determining whether an element associated with one or more applications is present in the SID.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
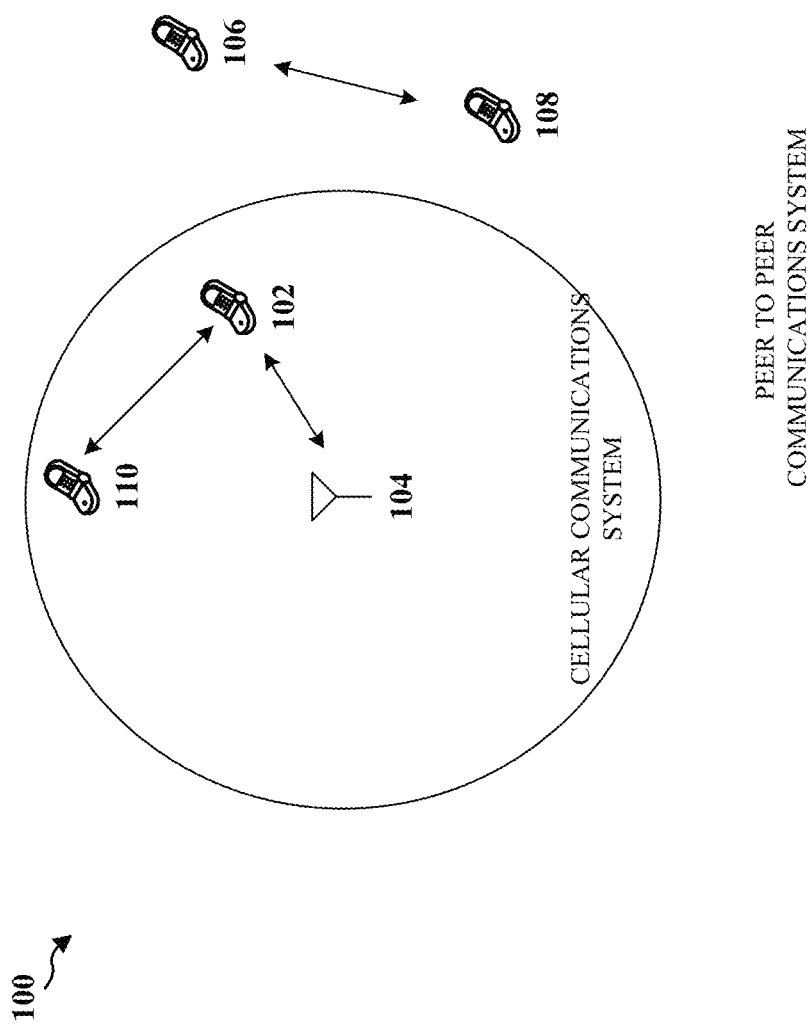
FIG. 1 is a drawing of a wireless peer-to-peer communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a drawing of an exemplary peer-to-peer communications system 100. The peer-to-peer communications system 100 includes a plurality of wireless devices 102, 106, 108, 110. The peer-to-peer communications system 100 may overlap with a cellular communications system, such as for example, a wireless wide area network (WWAN). Some of the wireless devices 102, 106, 108, 110 may communicate together in peer-to-peer communication, some may communicate with base station 104, and some may do both. For example, as shown in FIG. 1, the wireless devices 106, 108 are in peer-to-peer communication and the wireless devices 102, 110 are in peer-to-peer communication. The wireless device 102 may also communicate with base station 104.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 2:
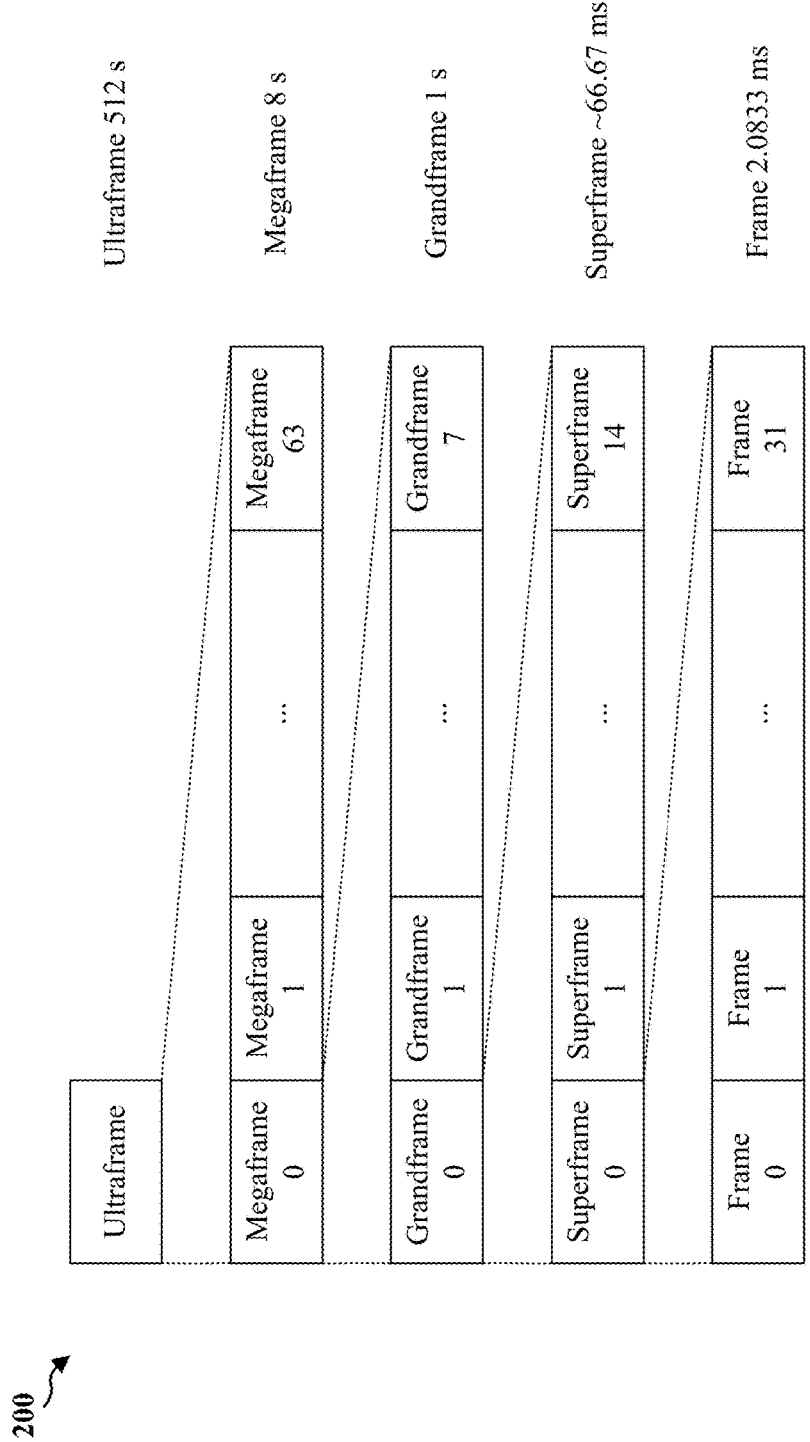
FIG. 2 is a diagram illustrating an exemplary time structure for peer-to-peer communication between the wireless devices.

FIG. 2 is a diagram 200 illustrating an exemplary time structure for peer-to-peer communication between the wireless devices. An ultraframe is 512 seconds and includes 64 megaframes. Each megaframe is eight seconds and includes eight grandframes. Each grandframe is one second and includes 15 superframes. Each superframe is approximately 66.67 ms and includes 32 frames. Each frame is 2.0833 ms.

Figure 3:
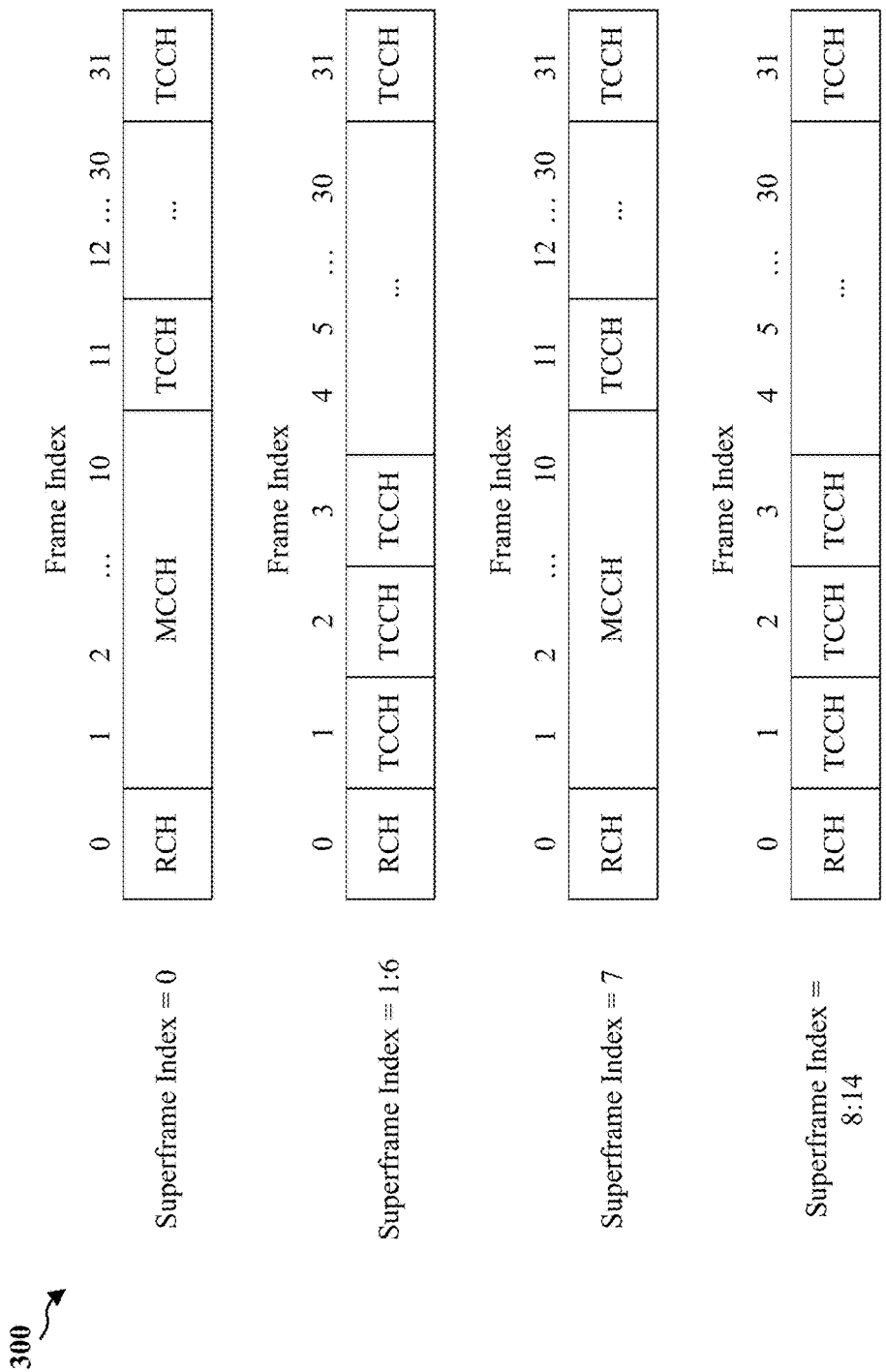
FIG. 3 is a diagram illustrating the channels in each frame of superframes in one grandframe.

FIG. 3 is a diagram 300 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 4:
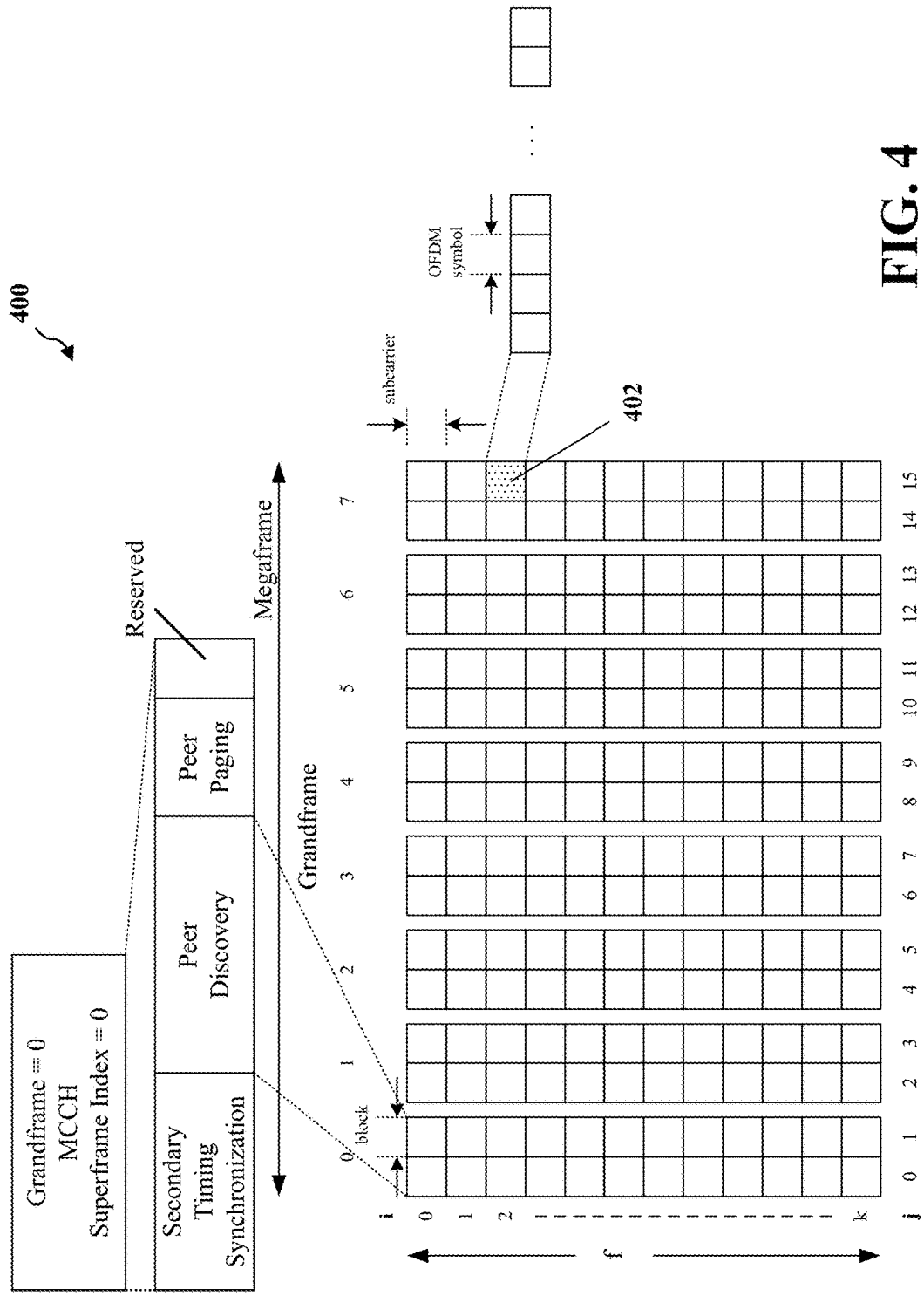
FIG. 4 is a diagram illustrating an operation timeline of a miscellaneous channel and a structure of a peer discovery channel.

FIG. 4 is a diagram 400 illustrating an operation timeline of the MCCH and an exemplary structure of a peer discovery channel. As discussed in relation to FIG. 3, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 4 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 402 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 5:
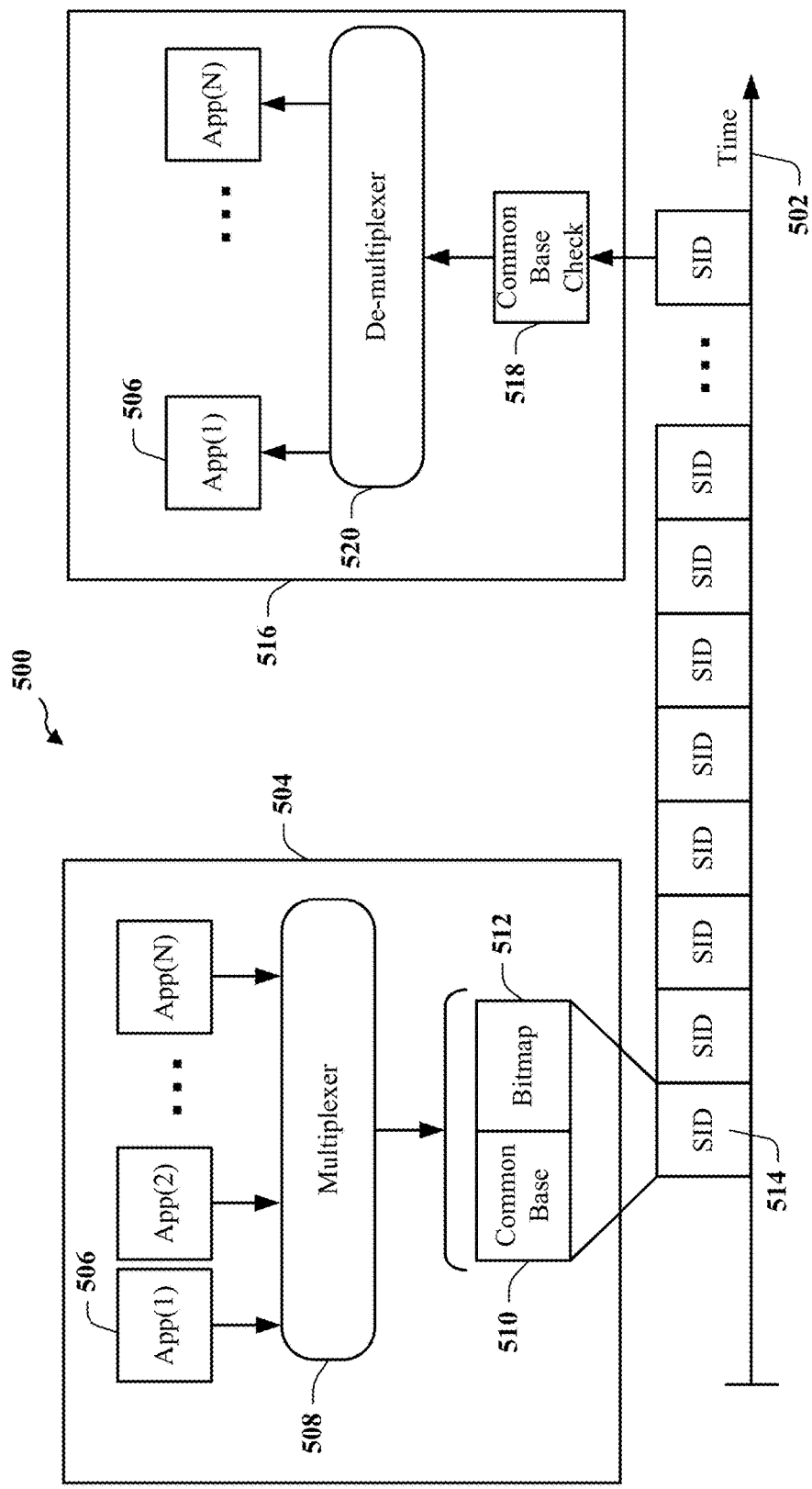
FIG. 5 is a diagram illustrating peer discovery using a super application identifiers according to an aspect.

FIG. 5 is a diagram 500 illustrating peer discovery using a super application identifier. As depicted in FIG. 5, a device 504 may generate a SID 514 and may communicate the SID 514 during available slots as time 502 progresses. Further, device 516 may be operable to receive the SID 514 communication and determine whether any application identifiers 506 included in the SID 514.

Within a device 504, application identifiers 506 may be multiplexed by a multiplexer 508. The output of this multiplexing operation may include a common base 514 and a bitmap 512. In one aspect, the common base 510 may be used to identify the common properties of application identifiers 506 included in the SID. For example, common bases 510 for a set of application identifiers 506 may include, but are not limited to, a device identity, a user profile (e.g. home or work), or an application suite identity, etc. In one aspect, the bitmap 512 may be used to indicate which application identifier 506 of a represented set (e.g., App(1), App(2), App(N), etc.) is discoverable. A number of application identifiers 506 which could be multiplexed may depend on the size of the available bitmap for use, user preferences, etc. For example, if the bitmap is 32-bits long, then up to 32 different application identifiers may be multiplexed.

For each application in device 504, multiplexer 508 may select a bit-index for that application. In one aspect where the application announces its application identifier, the selected bit in that position may be set to "1". While when an application is not available to device 504, and/or if device 504 does not allow an application to be discoverable, the corresponding bit in the SID 514 may be set to "0".

With respect to receiving the SID 514, device 516 may use a common base checking module 518 to determine whether any applications of interest have been communicated by device 504. In one aspect, when device 504 uses multiplexer 50, in order to the peer device 516 to interpret the SID, device 504 may share the bitmap information and the common base decoding information with peers which may be interested in discovering any of the application identified in the SID 514. In such aspect, this information may be shared by posting the information via out of band means (e.g., post it on the internet), by publishing the information via an over-arching application (e.g., app store), by directly disseminating the information, at least in part, to the other users who are interested in monitoring for the application identifiers, etc. In another aspect, the shared information may include an ordered list of applications corresponding to the bits on the SID which are well known and have fixed meaning for a given collection of applications (e.g., a set of Games by a games publisher, a set of applications by an applications provider, etc). Device 518, upon determining that SID may include one or more application identifiers 506 of interest may de-multiplex the bitmap using de-multiplexer 520.

In operation, instead of letting each application create and announce its application identifier(s) independently, use of the SID 514 allows applications to supply the identifier(s) 506 to a multiplexer function 508. The multiplexer 508 may combine the application identifiers 506 to create a bitmap 512. Bitmap 512 and common base 510 may be combined to form the SID 514. As such, device 504 may be able to announce the SID 514 on every available slot, instead of announcing application identifiers 506 (e.g., in a round-robin manner) with each application identifier only once announced during a fraction of available slots. Therefore, the discovery latency problem could be mitigated and the efficiency of the discovery channel could be much improved.

Figure 6:
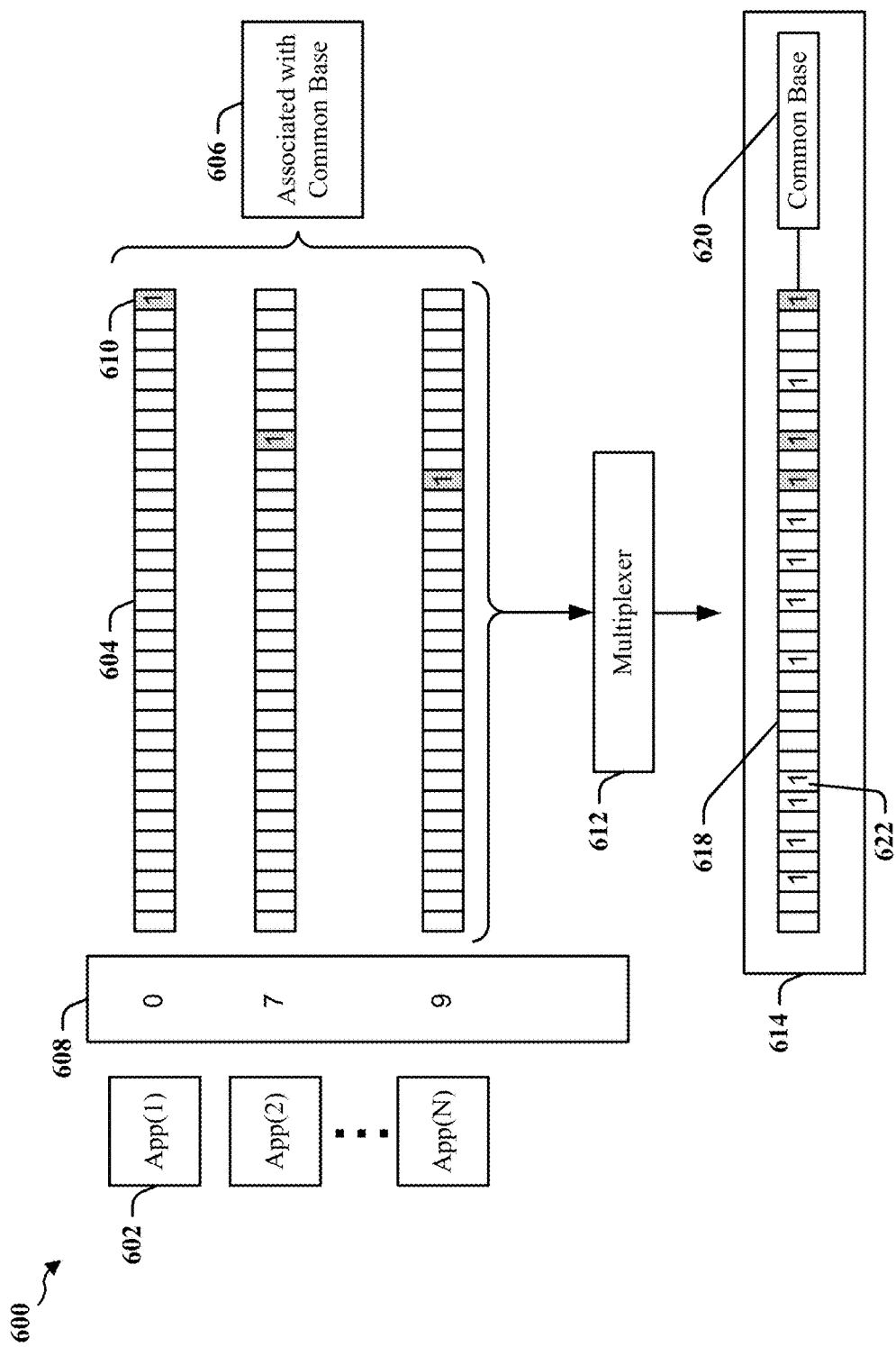
FIG. 6 is a diagram illustrating generation of a bitmap for a super application identifier according to an aspect.

FIG. 6 is a diagram 600 illustrating generation of a SID 614 including a bitmap 618 and a common base 620. A device may be operable to execute one or more applications 602. In one aspect, each of these applications 602 may be operable to announce its presence to other peer devices. To facilitate such announcements, the device may generate a SID 614 indicating the various applications 602 that are attempting to announce their presence to other peer devices. In one aspect, applications that have one or more attributes in common may be associated with a common base 606. Each application may also be allocated a bitmap index 608 that indicates an element 610 in a bitmap 604 that has been allocated for the application identifier.

Once the applications 602 have been assigned bitmap indexes 608, then a multiplexer 612 may combine the bitmaps 604 into a single bitmap 618. Further, a common base 620 may coupled to the multiplexed bitmap 618 to complete the generation of the SID 614. In one aspect, where there are more bitmap elements than applications, random values 622 may be added to the unused elements.

Figure 7:
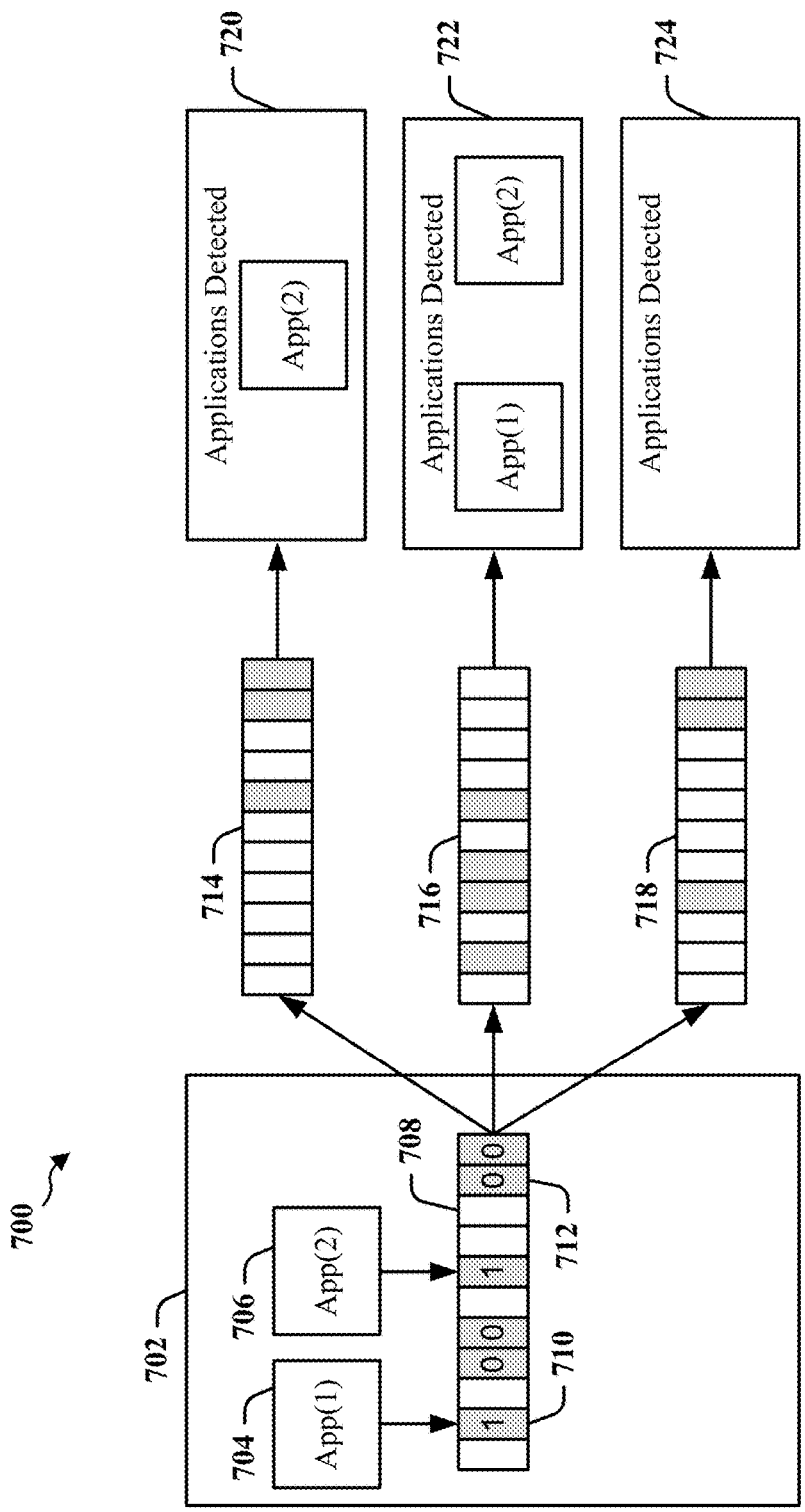
FIG. 7 is a diagram illustrating use of a bitmap mask in communication of a super application identifier during peer discovery

FIG. 7 is a diagram 700 illustrating use of a bitmap mask in communication of a super application identifier during peer discovery. Device 702 may be within range for discovery by one or more peer devices (720, 722, 724). Further, device 702 may include a plurality of applications 704, 706 may have common attributes and may be operable to announce their presence. As depicted in FIG. 7, applications 704 and 706 may be grouped using a common base and applications identifiers may be included in a bitmap 708. In one aspect, bitmap 708 may provide, for a given set of applications, a master-bitmap including a bit reserved for each of component application identifiers, regardless of whether the application is announced or not in a peer discovery channel at a given time by device 702. Bitmap 708 includes elements that have been allocated to indicate various applications, and bitmap index values to indicate whether the application is present on the device 702. For example, bitmap index 710 indicates that application 704 is present while bitmap index 712 indicates that another application is not present. In one aspect, a device 702 may share different subsets (714, 716, 718) of bitmap 708 with each potential monitoring peer devices (720, 722, 724), without disclosing the bit information which is irrelevant to a particular peer. For example, the bitmap subset 714 may indicate to device 720 that application 706 is available, bitmap subset 716 may indicate to device 722 that applications 704 and 706 are available, and bitmap subset 718 may indicate that no applications are available to device 724.

Figure 8:
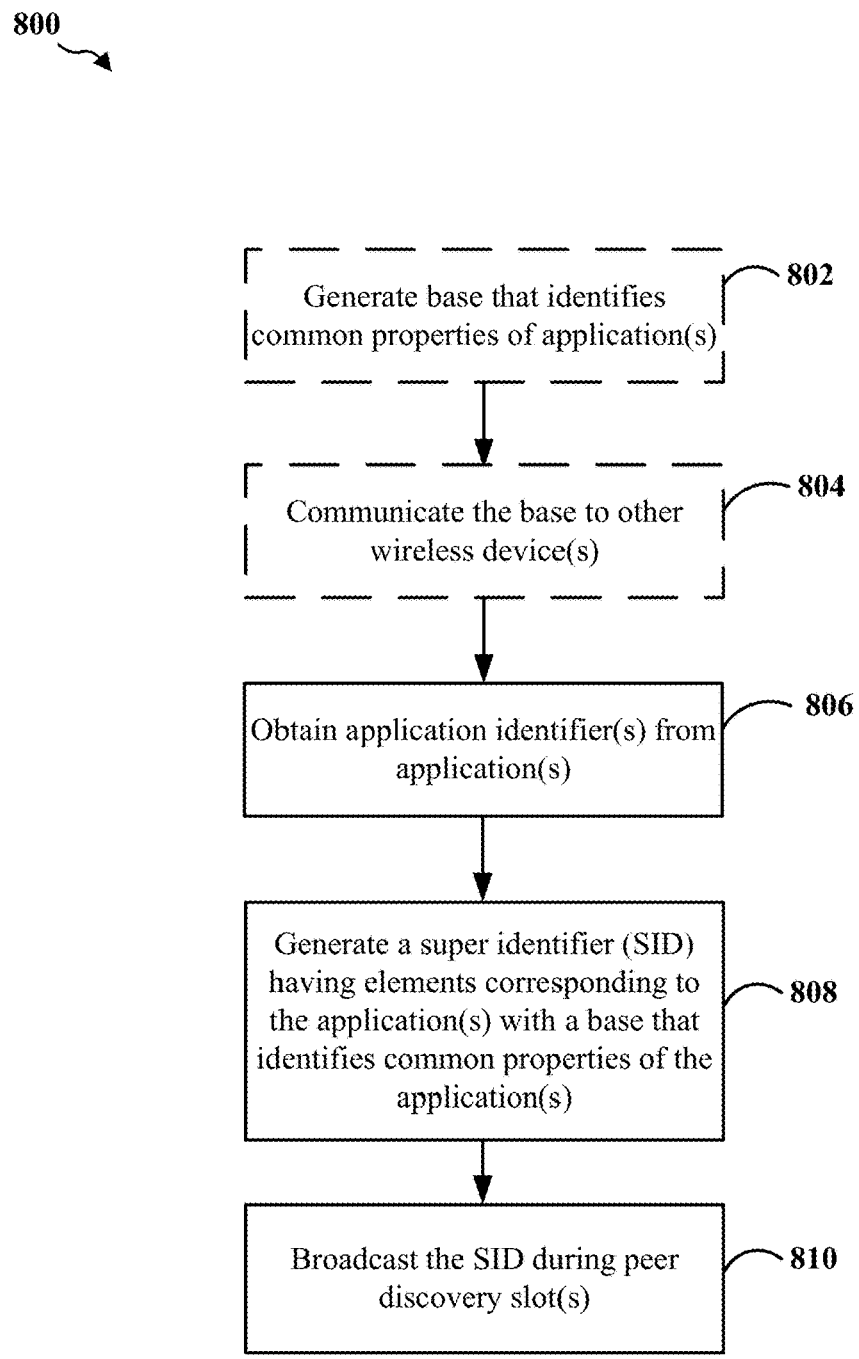
FIG. 8 is a flow chart of a method of wireless communication.

FIG. 8 is a flow chart 800 of a method of wireless communication. The method may be performed by a wireless device. In one optional aspect, at block 802, the wireless device may generate a base. In one aspect, the base may include one or more common properties associated with one or more applications. For example, a base may indicate that the one or more applications share attributes such as, a common developer, common subject matter (e.g., games, social media, etc.), common device identity, common user profile, etc. In the optional aspect, at block 804, the generated base may be communicated to one or more other devices and/or network entities. In one such aspect, the base may be broadcast for reception by one or more devices within range. In another aspect, the base may be posted out of band (e.g., posted on the internet, published via an over-arching application (e.g., app store), disseminated at least in part to the other users who are interested in monitoring for application identifiers, etc.). In still another aspect, an ordered list of applications corresponding to the bits on the SID may be known and may have fixed meaning for a given collection of application (e.g., a set of games by a games publisher, a set of applications by an applications provider, etc.).

At block 806, the wireless device may obtain application identifiers from one or more applications. In one aspect, each application identifier may indicate one or more interactive attributes associated with the application that may be discoverable by other devices and/or applications.

At block 808, the wireless device may generate a SID having elements corresponding to the one or more applications with a base that identifies one or more common properties of the one or more applications. In one aspect, the generation of the SID may include generating of a bitmap with a bitmap index for each element in the SID, setting a value in the bitmap index to indicate availability of each of the one or more applications. In another aspect, the generation of the SID may include generating one or more subsets that may indicate availability of subsets of the one or more applications. In another aspect, the generation of the SID may further include allocating random values to at least a portion of one or more unused elements in the bitmap index. As used herein, the one or more common properties may include various attributes associated with the one or more applications, include but not limited to, a device identity, a user profile, an application suite identity, etc.

At block 810, the wireless device may communicate the generated SID during one or more peer discovery slots allocated for the wireless device. In one aspect, the communication of the SID may further include transmitting the SID to a network entity that may be accessible by a second wireless device. In another aspect, the communication of the SID may further include broadcasting using a peer discovery channel that time multiplexes peer discovery slots. In another aspect, the communication of the SID may further include broadcasting at a comparatively reduced temporal frequency than the wireless device would transmit each of the one or more application identifiers separately.

Figure 9:
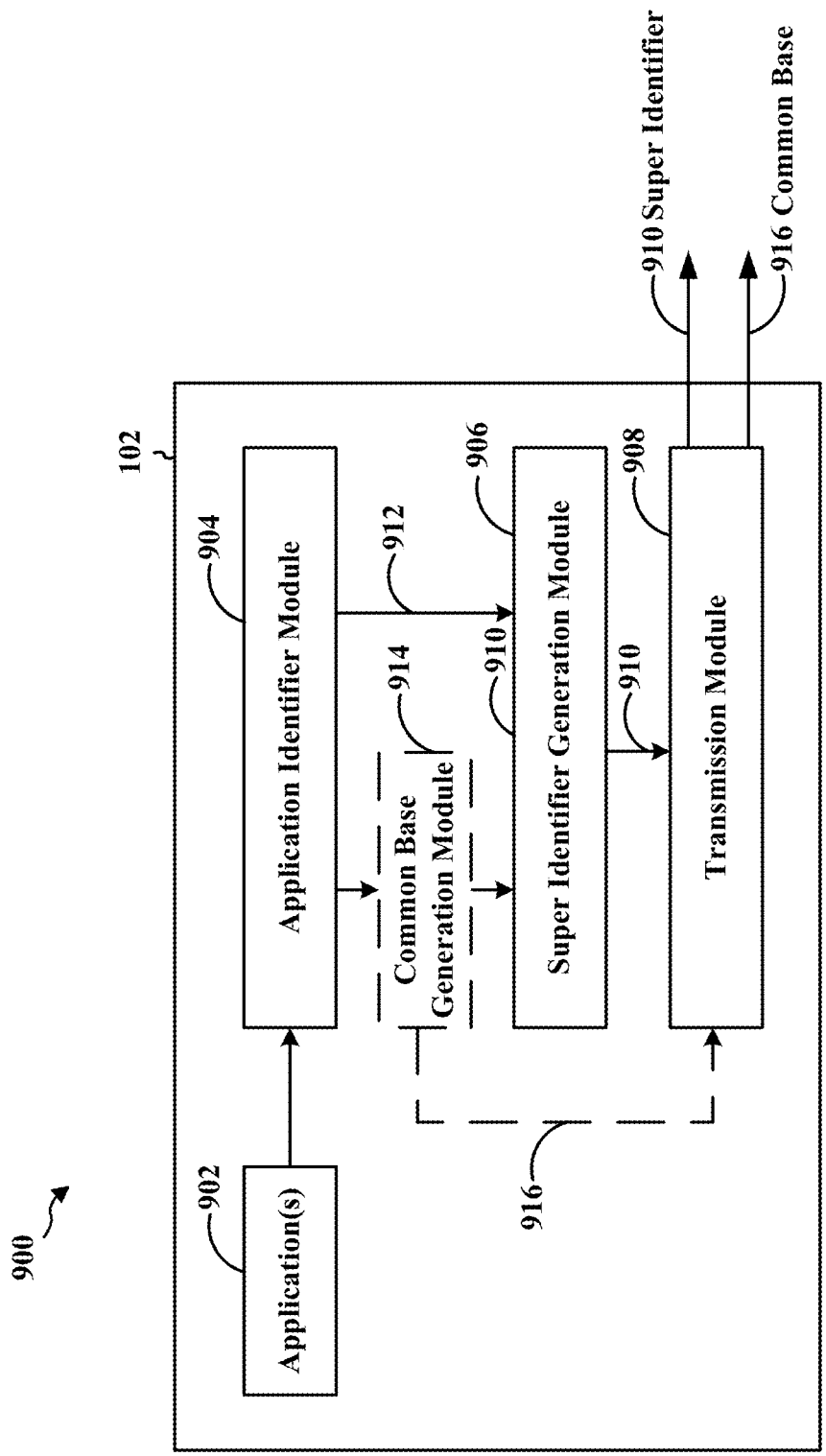
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 102. The apparatus 102 may include one or more applications 902. In one aspect, for discovery purposes, each of the one or more applications 902 may be operable to announce its presence periodically and/or continuously in a time-slotted fashion using a shared peer discovery channel of limited resources. Apparatus 102 includes application identifier module 904 that may obtain one or more application identifiers 912 from one or more applications 902 on wireless device 102. Apparatus 102 further includes a super identifier generation module 906 that generates a SID 910 having elements corresponding to the one or more applications 902 with a base 916 that identifies one or more common properties of the one or more applications 902. Apparatus 102 further includes a transmission module 908 that communicates the SID during one or more peer discovery slots allocated for the wireless device. In an optional aspect, apparatus 102 may further include common base generation module 914 that may generate the base 916 based on attributes associated with the one or more applications 902. In such an aspect, apparatus 102 may communicate the common base 916 to one or more other devices, may post the common base to a network entity (e.g., base station, application server, etc.), etc.

The apparatus may include additional modules that perform each of the steps of the algorithm in the aforementioned flow chart FIG. 8. As such, each step in the aforementioned flow chart FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
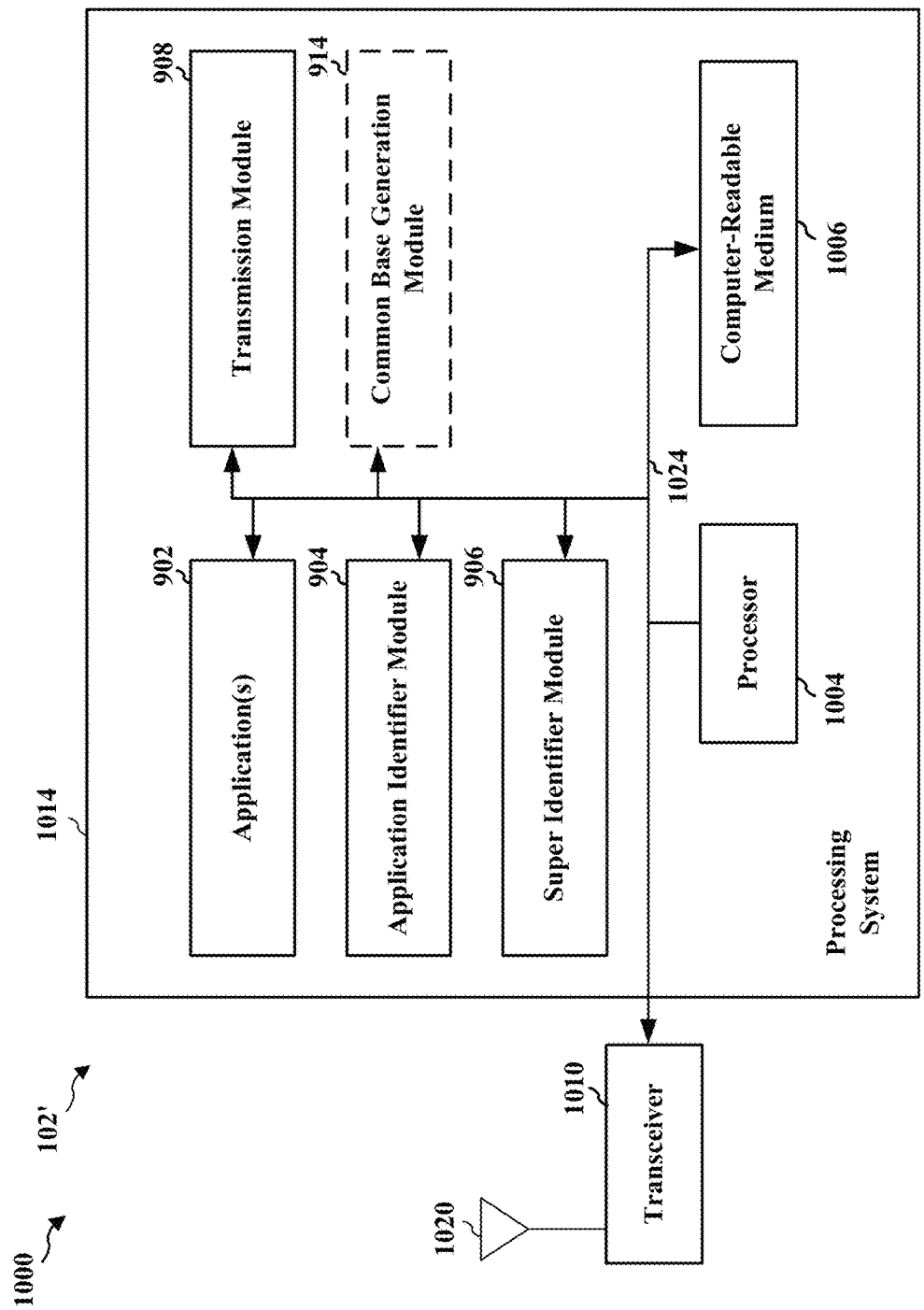
FIG. 10 is a diagram illustrating an example of a hardware implementation for an apparatus employing a processing system.

FIG. 10 is a diagram illustrating an example of a hardware implementation for an apparatus 102' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 902, 904, 906, 908, optionally 914, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 902, 904, 906, 908 and 914. The modules may be software modules running in the processor 1004, resident/stored in the computer readable medium 1006, one or more hardware modules coupled to the processor 1004, or some combination thereof.

In one configuration, the apparatus 102/102' for wireless communication includes means for obtaining one or more application identifiers from one or more applications on a wireless device, means for generating a SID having elements corresponding to the one or more applications with a base that identifies one or more common properties of the one or more applications, and means for communicating the SID during one or more peer discovery slots allocated for the wireless device. In one aspect of the apparatus 102/102', the means for generating may further include means for generating a bitmap with a bitmap index for each element in the SID, means for setting a value in the bitmap index to indicate availability of each of the one or more applications, and the means for communicating may further include means for broadcasting the bitmap index as part of the SID. In one aspect of the apparatus 102/102', the means for generating may further include means for generating one or more subsets of the bitmap index that may indicate availability of a subset of the one or more applications. In one aspect of the apparatus 102/102' where a number of elements in the super identifier is greater than a number of the one or more applications, the means for generating may further include means for allocating random values to at least a portion of one or more unused elements in the bitmap index. In one aspect of the apparatus 102/102', the means for communicating may further include means for transmitting the SID to a network entity that may be is accessible by a second wireless device. In one aspect of the apparatus 102/102', the means for communicating may further include means for broadcasting using a peer discovery channel that time multiplexes peer discovery slots. In one aspect of the apparatus 102/102', the means for communicating may further include means for broadcasting at a comparatively reduced temporal frequency than the wireless device would transmit each of the one or more application identifiers separately. The aforementioned means may be one or more of the aforementioned modules of the apparatus 102 and/or the processing system 1014 of the apparatus 102' configured to perform the functions recited by the aforementioned means.

Figure 11:
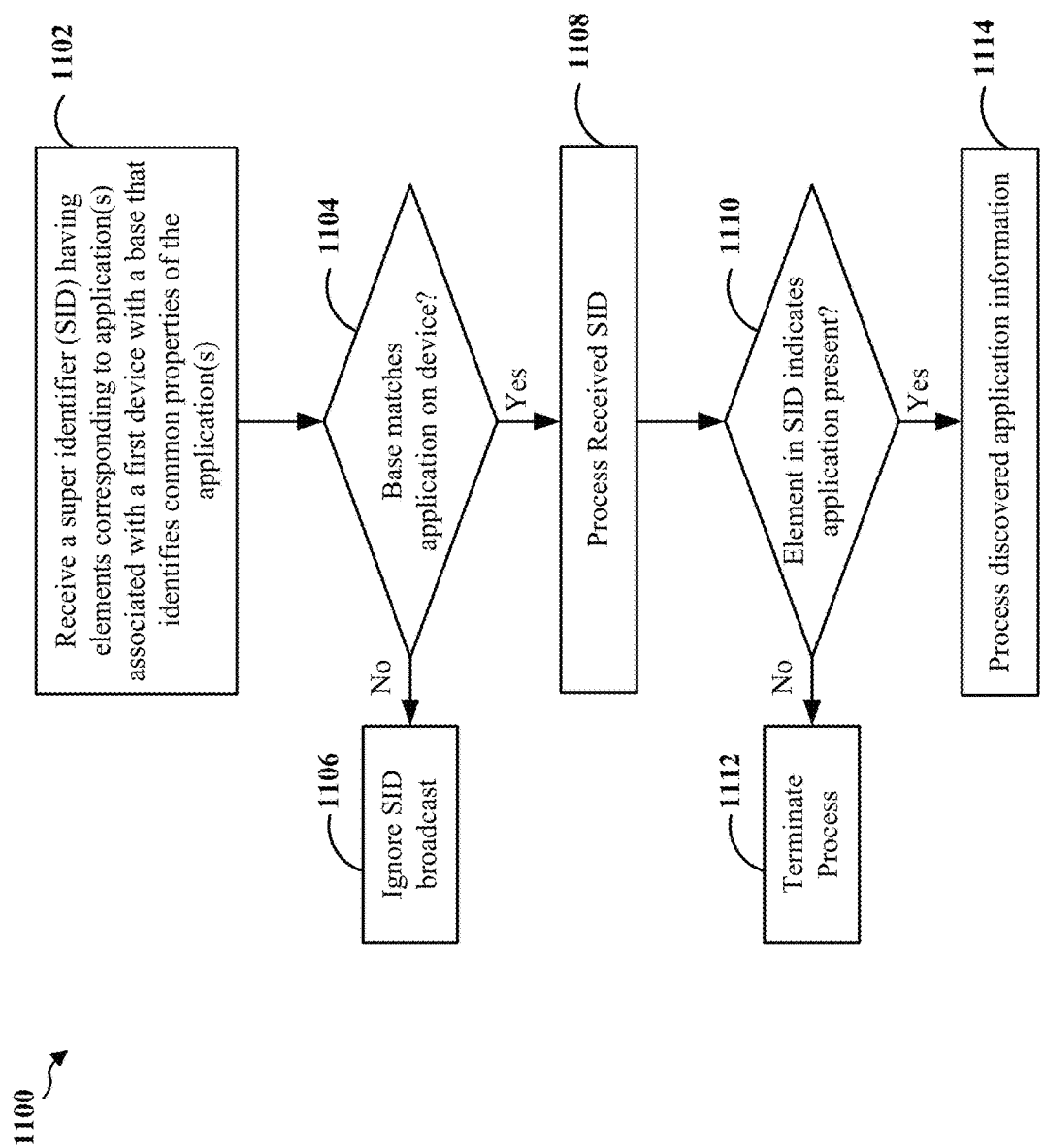
FIG. 11 is a flow chart of another method of wireless communication.

FIG. 11 is a flow chart 1100 of a method of wireless communication. The method may be performed by a wireless device. As shown in FIG. 11, at block 1102, the wireless device receives a SID having elements corresponding to one or more applications associated with a second device with a base that identifies one or more common properties of the one or more applications. In one aspect, the SID may be received from a network entity. In an optional aspect, the reception of the SID may be preceded by reception of common base decoding information that allows the wireless device to decode the base information included in the SID. In another aspect, the SID may include a bitmap with a bitmap index for each element in the SID.

At block 1104, the wireless device determines if there is a match between the received base and one or more attributes associated with one or more applications operable on the wireless device. If at block 1104, the wireless device determines that is not match with the received base, then at block 1106 the process may terminate and the wireless device may ignore the SID broadcast. In one such aspect, the wireless device may ignore the SID broadcast for a period of time prior to attempting to process a base received from the second device again. By contrast, if at block 1104, the wireless device determines that there is a match between the received base and one or more attributes associated with one or more applications operable on the wireless device, then at block 1108, the SID may be processed. In one aspect, processing the SID may include processing a bitmap included in the SID.

At block 1110, the wireless device may determine whether an element in the SID associated with the application operable on the first device is present in the SID. If at block 1110, the wireless device determines that the element and/or elements are not present, then at block 1112, the process may stop. By contrast, if at block 1110, the wireless device determines that an element and/or elements in the SID associated with the application operable on the first device is present in the SID, then at block 1114, the wireless device may processed information associated with the one or more discovered applications.

Figure 12:
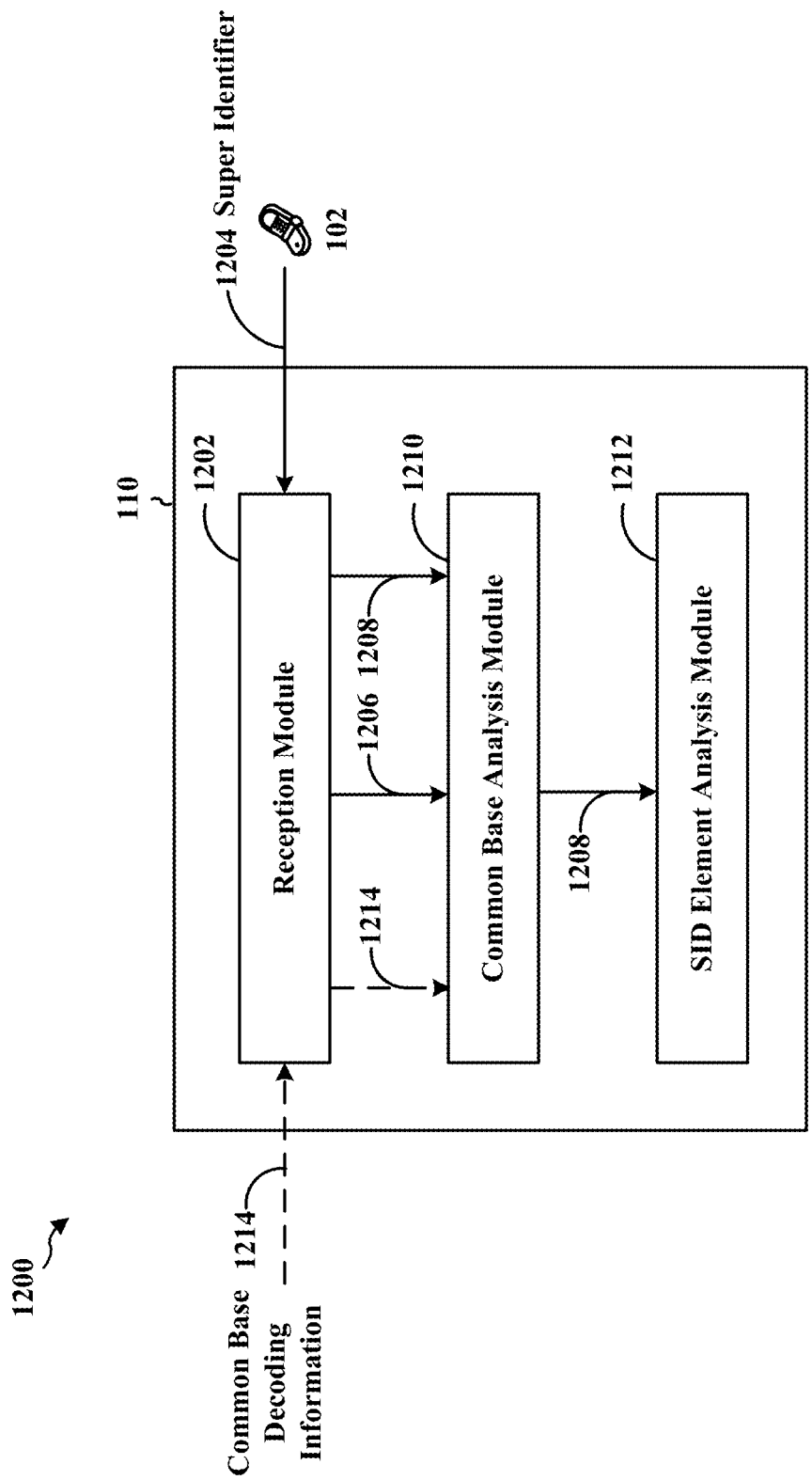
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 110. The apparatus 110 includes a reception module 1202 that receives a SID 104 communicated from another device 102 during one or more peer discovery slots allocated to the device 102. In one aspect, the SID 1204 may include a base 1206 that identifies one or more common properties of the one or more applications, and a bitmap 1208 that includes a bitmap index for each element in the SID 1204. In an optional aspect, apparatus 110 may receive common base decoding information 1214 prior to reception of the SID 1204. Apparatus 110 includes a common base analysis module 1210 that determines whether there is a match between at least one of the one or more common properties in the base 1206 and an application operable on the apparatus 110. Apparatus 110 further includes a SID element analysis module 1212 that determining whether an element in the SID associated with the application operable on the first device is present in the SID. In one aspect, apparatus 110 and apparatus 102 may be the same apparatus. In another aspect, one or more modules associated with apparatus 110 may be available in apparatus 102 and/or one or more modules associated with apparatus 102 may be available to apparatus 110.

The apparatus may include additional modules that perform each of the steps of the algorithm in the aforementioned flow chart FIG. 11. As such, each step in the aforementioned flow chart FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
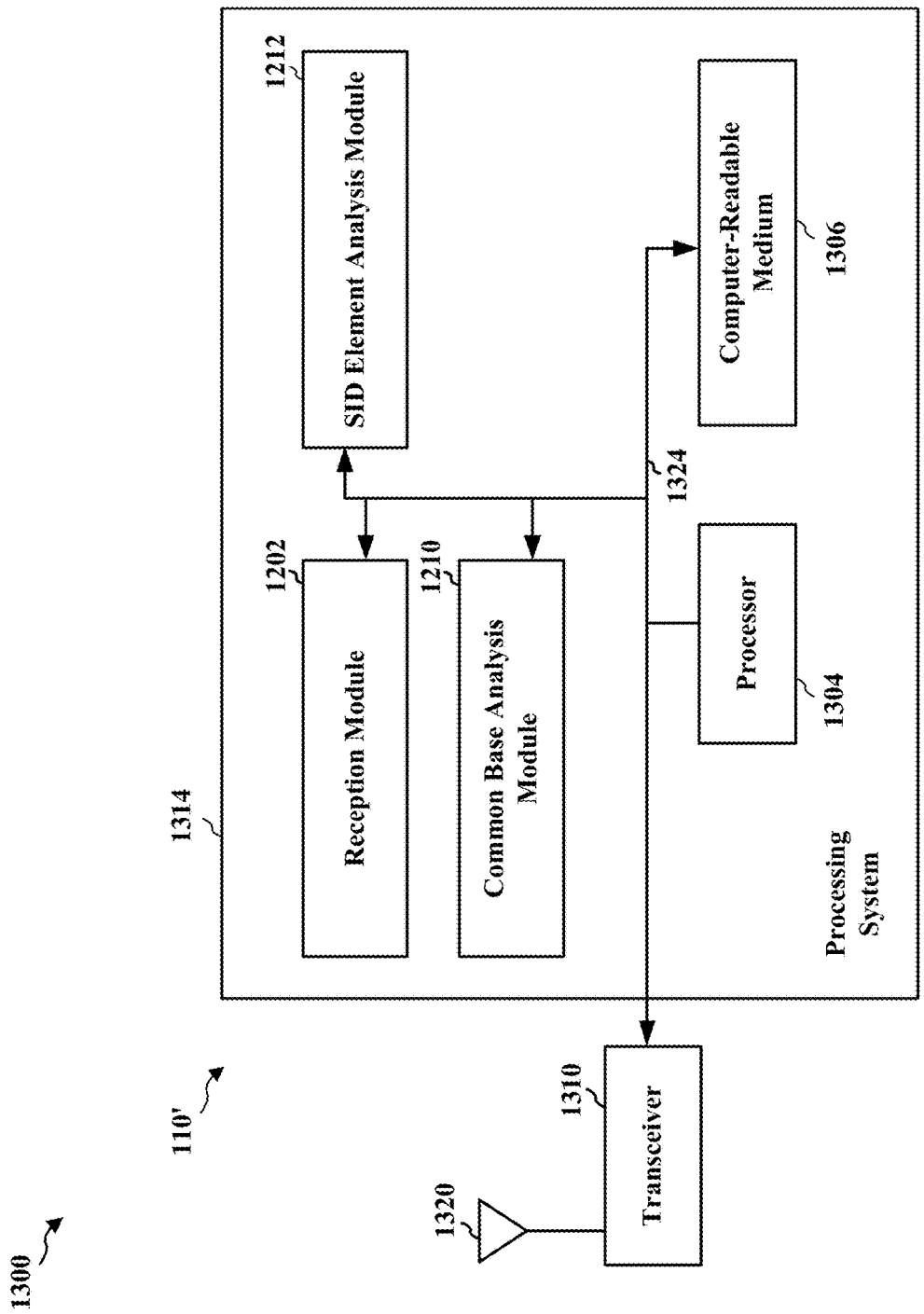
FIG. 13 is a diagram illustrating an example of a hardware implementation for an apparatus employing a processing system.

FIG. 13 is a diagram illustrating an example of a hardware implementation for an apparatus 110' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1202, 1210, 1212, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1202, 1210, and 1212. The modules may be software modules running in the processor 1304, resident/stored in the computer readable medium 1306, one or more hardware modules coupled to the processor 1304, or some combination thereof.

In one configuration, the apparatus 110/110' for wireless communication includes means for receiving a SID having elements corresponding to one or more applications associated with a second device with a base that identifies one or more common properties of the one or more applications, means for determining a match between at least one of the one or more common properties in the base and an application operable on the first device, and means for determining whether an element in the SID associated with the application operable on the first device is present in the SID. In one aspect of apparatus 110/110' the means for receiving may include means for receiving a bitmap index for each element in the SID, the means for determining whether an element associated with the one or more applications is present in the SID is based on the bitmap index. In one aspect of apparatus 110/110' the means for receiving may include means for receiving at least one of the SID, or base decoding information from a network entity. The aforementioned means may be one or more of the aforementioned modules of the apparatus 110 and/or the processing system 1314 of the apparatus 110' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications for a wireless device, comprising:
    identifying an application on the wireless device, the application belonging to a group of applications on the wireless device;
    generating a super identifier (SID) including a base that identifies the group and an identifier of the application within the group, comprising:
        generating a bitmap including bitmap indexes, each bitmap index corresponding to an application within the group;
        setting a value in the bitmap index corresponding to the application on the wireless device, wherein the set value is the identifier and indicates availability of the application, and wherein the number of indexes in the bitmap is greater than the number of applications in the group, such that one or more of the indexes are unused for identifying applications of the group; and
        allocating random values to one or more unused bitmap indexes; and
    communicating the SID during one or more peer discovery slots allocated for the wireless device, wherein the communicating further comprises broadcasting the bitmap index as part of the SID.

2. The method of claim 1, wherein the generating the SID further comprises:
    generating a subset of the bitmap, wherein the subset indicates availability of a subset of the group of applications.

3. The method of claim 1, wherein the communicating further comprises transmitting the SID to a network entity, wherein the network entity is accessible by a second wireless device.

4. The method of claim 1, wherein the communicating further comprises broadcasting using a peer discovery channel that time multiplexes peer discovery slots.

5. The method of claim 1, wherein the base and group include, respectively, at least a device identity and applications associated with the identified device, a user profile identity and applications associated with the identified user profile, an application suite identity and applications in the identified applications suite, a subject matter identity and applications associated with the identified subject matter, or a developer identity and applications produced by the identified developer.

6. The method of claim 1, further comprising:
    generating the base; and communicating the base to one or more peer devices.

7. The method of claim 6, wherein the communicating the base comprises at least broadcasting the base, posting the base to an internet site, or posting the base to an application store.

8. The method of claim 1, wherein the SID includes a plurality of elements, each element corresponding to an application within the group, wherein the identifier is included in the element that corresponds to the application on the device.

9. An apparatus for wireless communication, the apparatus being a wireless device comprising:
    means for identifying an application on the wireless device, the application belonging to a group of applications on the wireless device;
    means for generating a super identifier (SID) including a base that identifies the group and an identifier of the application within the group, wherein the means for generating the SID is configured to:
        generate a bitmap including bitmap indexes, each bitmap index corresponding to an application within the group;
        set a value in the bitmap index corresponding to the application on the wireless device, wherein the set value is the identifier and indicates availability of the application, and wherein the number of indexes in the bitmap is greater than the number of applications in the group, such one or more of the indexes are unused for identifying applications of the group; and
        allocate random values to one or more unused bitmap indexes; and
    means for communicating the SID during one or more peer discovery slots allocated for the wireless device, wherein the means for communicating is further configured to broadcast the bitmap index as part of the SID.

10. The apparatus of claim 9, wherein the means for generating the SID is further configured to:
    generate a subset of the bitmap, wherein the subset indicates availability of a subset of the group of applications.

11. The apparatus of claim 9, wherein the means for communicating is configured to transmit the SID to a network entity, wherein the network entity is accessible by a second wireless device.

12. The apparatus of claim 9, wherein the means for communicating is configured to broadcast using a peer discovery channel that time multiplexes peer discovery slots.

13. The apparatus of claim 9, wherein the base and group include, respectively, at least a device identity and applications associated with the identified device, a user profile identity and applications associated with the identified user profile, an application suite identity and applications in the identified applications suite, a subject matter identity and applications associated with the identified subject matter, or a developer identity and applications produced by the identified developer.

14. The apparatus of claim 9, further comprising:
    means for generating the base; and
    means for communicating the base to one or more peer devices.

15. The apparatus of claim 14, wherein the means for communicating the base is configured to perform at least broadcasting the base, posting the base to an internet site, or posting the base to an application store.

16. An apparatus for wireless communication, the apparatus being a wireless device comprising:
a memory; and
at least one processor coupled to the memory and configured to:
identify an application on the wireless device, the application belonging to a group of applications on the wireless device;
generate a super identifier (SID) including a base that identifies the group and an identifier of the application within the group, wherein, to generate the SID, the at least one processor is further configured to:
generate a bitmap including bitmap indexes, each bitmap index corresponding to an application within the group;
set a value in the bitmap index corresponding to the application on the wireless device, wherein the set value is the identifier and indicates availability of the application, and wherein the number of indexes in the bitmap is greater than the number of applications in the group, such one or more of the indexes are unused for identifying applications of the group; and
allocate random values to one or more unused bitmap indexes; and
communicate the SID during one or more peer discovery slots allocated for the wireless device, wherein, to communicate the SID, the at least one processor is further configured to broadcast the bitmap index as part of the SID.

17. The apparatus of claim 16, wherein, to generate the SID, the at least one processor is further configured to:
generate a subset of the bitmap, wherein the subset indicates availability of a subset of the group of applications.

18. The apparatus of claim 16, wherein, to communicate the SID, the at least one processor is further configured to transmit the SID to a network entity, wherein the network entity is accessible by a second wireless device.

19. The apparatus of claim 16, wherein, to communicate the SID, the at least one processor is further configured to broadcast using a peer discovery channel that time multiplexes peer discovery slots.

20. The apparatus of claim 16, wherein the base and group include, respectively, at least a device identity and applications associated with the identified device, a user profile identity and applications associated with the identified user profile, an application suite identity and applications in the identified applications suite, a subject matter identity and applications associated with the identified subject matter, or a developer identity and applications produced by the identified developer.

21. The apparatus of claim 16, wherein the at least one processor is further configured to:
generate the base; and
communicate the base to one or more peer devices.

22. The apparatus of claim 21, wherein, to communicate the base, the at least one processor is further configured to perform at least broadcasting the base, posting the base to an internet site, or posting the base to an application store.

23. A non-transitory computer-readable medium storing computer executable code for a wireless device, comprising code for:
identifying an application on the wireless device, the application belonging to a group of applications on the wireless device;
generating a super identifier (SID) including a base that identifies the group and an identifier of the application within the group, comprising
generating a bitmap including bitmap indexes, each bitmap index corresponding to an application within the group; and
setting a value in the bitmap index corresponding to the application on the wireless device, wherein the set value is the identifier and indicates availability of the application, and wherein the number of indexes in the bitmap is greater than the number of applications in the group, such one or more of the indexes are unused for identifying applications of the group; and
allocating random values to one or more unused bitmap indexes; and
communicating the SID during one or more peer discovery slots allocated for the wireless device, wherein the communicating further comprises broadcasting the bitmap index as part of the SID.

24. The non-transitory computer-readable medium of claim 23, wherein the code for generating the SID further comprises code for:
generating a subset of the bitmap, wherein the subset indicates availability of a subset of the group of applications.

25. The non-transitory computer-readable medium of claim 23, wherein the code for communicating further comprises code for transmitting the SID to a network entity, wherein the network entity is accessible by a second wireless device.

26. The non-transitory computer-readable medium of claim 23, wherein the code for communicating further comprises code for broadcasting using a peer discovery channel that time multiplexes peer discovery slots.

27. The non-transitory computer-readable medium of claim 23, wherein the base and group include, respectively, at least a device identity and applications associated with the identified device, a user profile identity and applications associated with the identified user profile, an application suite identity and applications in the identified applications suite, a subject matter identity and applications associated with the identified subject matter, or a developer identity and applications produced by the identified developer.

28. The non-transitory computer-readable medium of claim 23, further comprising code for:
generating the base; and
communicating the base to one or more peer devices.

29. The non-transitory computer-readable medium of claim 28, wherein the code for communicating the base comprises code for at least broadcasting the base, posting the base to an internet site, or posting the base to an application store.

* * * * *